United States Patent [19]

Sawa et al.

[11] Patent Number: 4,842,926
[45] Date of Patent: Jun. 27, 1989

[54] LAMINATED PRODUCT

[75] Inventors: Eiji Sawa; Susumu Moriya; Hiroya Fukuda; Takashi Ohashi, all of Yokohama, Japan

[73] Assignee: Bridgestone Corporation, Tokyo, Japan

[21] Appl. No.: 180,970

[22] Filed: Apr. 13, 1988

[30] Foreign Application Priority Data

Apr. 17, 1987 [JP] Japan .................. 62-93338

[51] Int. Cl.⁴ .............................................. B32B 3/26
[52] U.S. Cl. .................. 428/224; 428/244; 428/245; 428/253; 428/283; 428/284; 428/290; 428/304.4; 428/305.5; 428/317.9; 428/319.7
[58] Field of Search ............. 428/224, 244, 245, 253, 428/283, 284, 290, 304.4, 305.5, 317.9, 319.7

[56] References Cited

U.S. PATENT DOCUMENTS 4,171,410 10/1979 Fröb .............................. 428/317.9
4,595,706  6/1986 Milligan et al. .............. 428/305.5

Primary Examiner—William J. Van Balen
Attorney, Agent, or Firm—Fisher, Christen & Sabol

[57] ABSTRACT

A laminated product for use as motorcar seats, carpets, blankets, sofas, chair seats and the like, excellent in continuation of antistatic effect, characterized in that polyurethane foam having antistatic effect is laminated on the back side of a skin material to add antistatic capacity to the surface of the skin material without losing the comfortable feeling thereof.

25 Claims, 1 Drawing Sheet

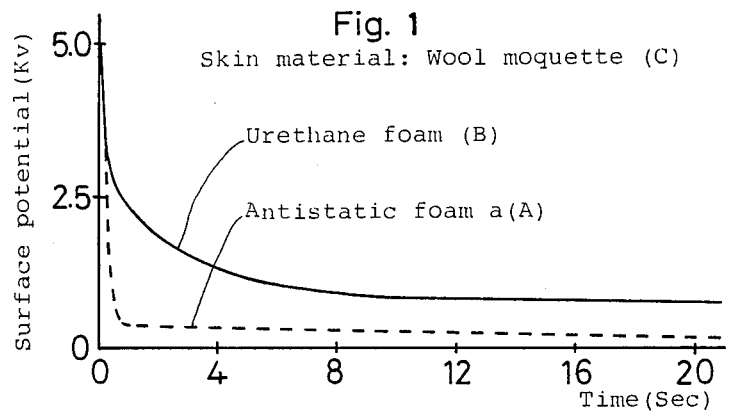
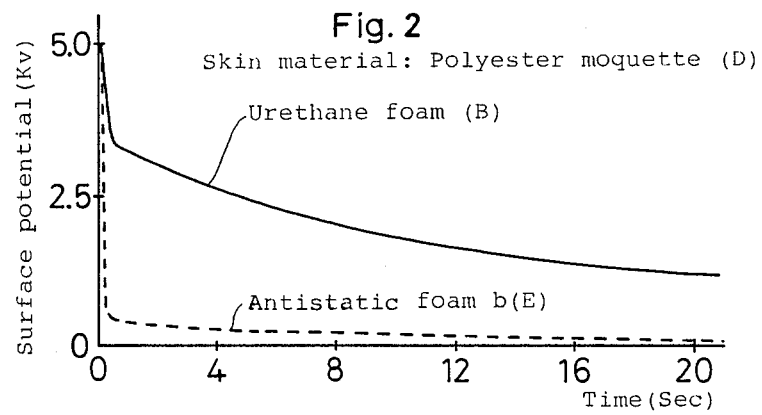
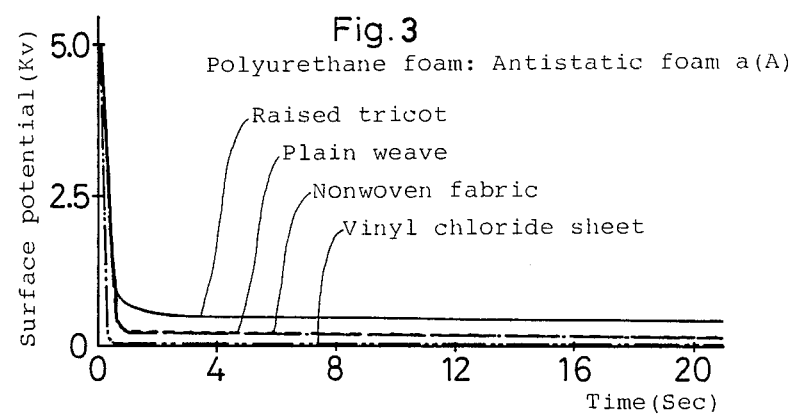

LAMINATED PRODUCT

BACKGROUND OF THE INVENTION

1. Field of the Invention

The present invention relates to a laminated product for use as motorcar seats, carpets, blankets, sofas, chairs seats and the like to create antistatic effect.

2. Prior Art

Interior materials for vehicles, particularly for motorcars have been variously improved these days to let persons in motorcars feel comfortable as though they were in house. To prevent static electricity from generating is extremely important because persons are shocked by discharge when they get in and out of the motorcars, they feel their cloths uncomfortably adhesive to their skin in the motorcars, and various kinds of motorcar control means which are supposed to become electronic in the future are forced to malfunction.

In order to make skin sheets (made of cloth in many cases) antistatic, (1) conductive fibers were woven into the sheets and (2) antistatic agent whose main component is a surface-active agent was sprayed onto the surface of the sheets.

SUMMARY OF THE INVENTION

When the above measure (1) is employed, however, the comfortable feeing of the cloth-made skin materials is lost and their cost becomes comparatively high. When the measure (2) is used, problems or technical problems are left unsolved relating to the durability of the antistatic agent and the continuation of antistatic effect.

The present invention is therefore intended to eliminate the above-mentioned drawbacks in such a way that polyurethane foam which has antistatic effect is laminated on the back sides of skin materials to make these skin materials antistatic.

Accordingly, an object of the present invention is to provide a laminated product for use as motorcar seats and the like to make them antistatic without losing the comfortable feeling of their skin materials and making their cost high.

Another object of the present invention is to provide a laminated product excellent in its durability and continuation of antistatic effect.

These and other objects as well as merits of the present invention will become apparent from the following detailed description with reference to the accompanying drawings.

BRIEF DESCRIPTION OF THE DRAWINGS

FIGS. 1 through 3 are graphs showing changes of the surface potential decay characteristic of laminated products.

DETAILED DESCRIPTION OF THE PREFERRED EMBODIMENTS

A laminated product according to the present invention comprises laminating polyurethane foam the back side of a skin material, said polyurethane foam having a surface apparent resistivity smaller than $1 \times 10^{13}$ ohms/sq. (condition: 23° C., 8%RH) provide antistatic effect.

The reason why the surface of the skin material can be made antistatic only by adding antistatic capacity not to the skin material but to polyurethane foam which is laminated on the back side of the skin material cannot be cleared with certainty because various factors complicatedly combine with one another to create total effect.

In a case where the skin material in the present invention is a cloth woven by those threads which are twisted by fibers, it may be supposed that "charge-escaping passage" through which charge on the surface of the fibers moves to urethane foam is formed because the charged fibers or the bottoms of those fibers which are contacted with the charged fibers are contacted with the electrostatically conductive urethane foam. As apparent from the examples which will be described later, however, the antistatic effect can be attained even when a sheet of vinyl chloride (0.5 mm thick) or unwoven cloth is used as the skin material. It is not certain therefore how the "charge-escaping passage" is formed, but it can be imagined that the "charge-escaping passage" or something is formed.

As the skin material employed by the present invention, it is preferable to use cloths such as fabric (moquette fabric, plain weave fabric), knitted cloth (tricot, double russel) and unwoven cloth. However, the skin material employed by the present invention is not limited to them but it may be a sheet of resin (or sheet of vinyl chloride, 0.5 mm thick, for example).

When cloths are used as the skin material, their raw material may be natural fibers such as fur and cotton, synthetic fibers such as nylon and polyester, and blendings of these fibers, and these fibers used as the raw material are not limited in their shape. There is no limit, too, in the specifications (thickness, apparent density and the like) of finished cloths and sheets.

Polyurethane foam employed by the present invention and having the antistatic effect is prepared by adding a surface-active agent of the anion, cation, or nonionic system to the raw material at the time when polyurethane is foamed, so as to disperse the surface-active agent in the resin or to cause a part of the surface-active agent to react with the resin, or by coating the skeleton surface of the foam directly with an antistatic agent or conductive matter according to the immersion manner or the like.

As the antistatic agent employed by the present invention, there can be cited plasticizers, alkali metal salts such as sodium thiocyanate, alkaline-earth metal salts, hydrophilic matters, humectants and combinations of these matters. Needless to say, the above-mentioned surface-active agents can also be used as the antistatic agent and the above-cited matters have the antistatic effect.

As the conductive matters employed by the present invention, there can be cited carbon black, metal, metal powder, conductive macromocules and the like.

Their surface apparent resistivity is smaller than $1 \times 10^{13}$ ohms/sq. (condition: 23° C., 8%RH). When it becomes larger than $1 \times 10^{13}$ ohms/sq. the antistatic capacity of urethane foam itself is not sufficient and it is not expected that the urethane foam can provide sufficient antistatic effect even if it is laminated. The lower limit of the surface apparent resistivity cannot be defined but it is difficult from the practical viewpoint to make the urethane foam have a value smaller than $1 \times 10^{5}$ ohms/sq. It is therefore preferable from the viewpoint of manufacturing cost that the surface apparent resistivity is larger than $1 \times 10^{5}$ ohm/sq. The surface apparent resistivity is preferably in a range of $1 \times 10^{12} - 1 \times 10^{5}$ ohms/sq.

The surface apparent resistivity of conventional urethane foam to which no antistatic measure is applied is larger than $1\times10^{15}$ ohms/sq. (condition: 23° C., 8%RH).

The surface apparent resistivity in the present invention was measured by connecting insulation resistance measuring sample foils (TR42) to the digital electrometer (TK-8652) made by Advantest Corporation.

The thickness of antistatic urethane foam which is laminated on the back side of the skin material may be larger than 1 mm, but it is preferable from the viewpoint of physical strength and capacity continuation that the urethane foam which is usually used as the welding material from the viewpoint of feeling is 8–10 mm thick. The urethane foam has no limit in its density and physical property, but it may have flame retarding and flame laminating abilities.

It is not particularly limited how the skin material and the antistatic urethane foam are laminated. They may be bonded each other by a common bonding agent, for example. The bonding agent is preferably of the polyurethane system and it may have antistatic capacity. They may be bonded each other according to the flame laminating manner which is now popular from the viewpoint of feeling and cost, because it is preferable from the viewpoint of performance that the antistatic foam is contacted directly with the cloth. They may be bonded each other according to the flame laminating or kilting manner.

One, two or more layers of conductive matter may be bonded to the open side of polyurethane foam or the polyurethane foam itself may be piled in two or more layers in the present invention.

Some examples of the laminated product according to the present invention will be described but it should be understood that the present invention is not limited to these examples. The word "part" which will be set forth below means weight part unless it is specified.

EXAMPLE 1:

Urethane foam (A), 2 m (width)×1 m (height)=2 m (length), was prepared from the following urethane foam raw materials, using the well-known polyurethane slub stock foam manufacturing apparatus. The surface apparent resistivity of this urethane foam was $5\times10^{11}$ ohms/sq. (23° C., 8%RH).

| Urethane foam raw materials | |
|---|---|
| Name | Parts |
| Polyol of the glycerine base polyether system (Mw 3000) (Trade name: Voranol made by Dow Chemical Corporation) | 100.0 |
| Water | 3.4 |
| Surfactant of the dimethyl polysiloxane system (Trade name: "L-520" made by Japan Unica Corporation) | 1.0 |
| Triethylenediamine (including 67% of dipropylene glycol) (Trade name: "Dabuco 33LV" made by Mitsui Air Product Corporation) | 0.3 |
| Stannus octate (Trade name: "Stanoct" made by Yoshihuji Pharmaceutical Corporation) | 0.4 |
| Alkyldimethylethylammoniumethylsulfate (including 20% of dipropylene glycol) | 10.0 |

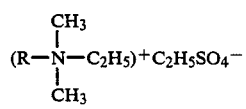

(R represents alkyl radical having carbons 6–8) (Trade name: "LAROSTAT 377 DPG" made by Jordan Chemical Corporation, U.S.A)

| | |
|---|---|
| N—ethylortho (and para) toluene sulfon amide | 10.0 |

[structure of toluene sulfonamide with $SO_2NH(C_2H_5)$ and $CH_3$ groups on benzene ring]

(Trade name: Topcizer No. 3 made by Fuji Amide Chemical Corporation)

The urethane foam (A) was sliced, each 10 mm thick, to form an antistatic foam a (A). This antistatic foam a (A) was bonded to wool moquette cloth (C) which was used for motorcar seats by means of a bonding agent of the polyurethane system. A laminated product according to the present invention was thus obtained. This was called our sample 1 and the electrostatic property of our this sample 1 was valued as follows.

The electrostatic property of laminated products was valued according to the Federal Test Method Standard 101C Method 4046 (1985). The measuring device used as STATIC DECAY METER (Model 406C) made by ETS Corporation, U.S.A. based on the above standard. Samples to be measured were conditioned over 24 hours under the measuring condition. Concrete results were obtained by applying a potential of 5000 V to the surfaces of objects to be measured and measuring the times during which the potential decays to 500 V. When this decay time is shorter than $\frac{1}{2}$sec, preferable electrostatic property is exhibited (see an American Standard NFPA 99 1984).

The time during which the surface potential decays from 5000 V to 500 V is shown in Table 1 and the decay characteristic is shown in FIG. 1.

COMPARISON EXAMPLE 1:

A conventional urethane foam (B) was obtained same as in the case of the example 1 but without adding any antistatic agent. The surface apparent resistivity of this conventional urethane foam (B) was $3\times10^{15}$ ohms/sq. (23° C., 8%RH). The conventional urethane foam (B) was sliced same as in the case of the example 1 and bonded to the cloth (C). A comparison sample 1 was thus obtained.

The comparison sample 1 was valued, same as in the case of the example 1, about its electrostatic property. Results thus obtained are shown in Table 1 and FIG. 1.

A reference sample 1 was prepared only by the antistatic foam a (A) of the example 1, a reference sample 2 was prepared only by the conventional urethane foam (B) used in the comparison example 1, and a reference sample 3 was prepared only by the wool moquette cloth (C), and their electrostatic properties were valued same as in the case of the example 1. Results thus obtained are shown in Table 1.

EXAMPLE 2:

An antistatic foam b (E) was prepared by immersing the common urethane foam (B) which was used in the comparison example 1 with carbon black. The surface apparent resistivity of this antistatic foam b (E) was $7\times10^5$ ohms/sq. (23° C., 8%RH).

The antistatic foam b (E) was sliced, each 10 mm thick, and bonded to a polyester moquette cloth (D) which is used for motorcar seats by a bonding agent of the polyurethane system. A laminated product according to the present invention was thus obtained and used as our sample 2.

This sample was valued, same as in the case of the example 1, about its electrostatic property. Results thus obtained are shown in Table 1 and FIG. 2.

COMPARISON EXAMPLE 2:

A laminated product was prepared same as in the case of the example 2 but without immersing it with carbon black. This laminated product was used as a comparison example 2. The electrostatic property of this comparison sample 2 was valued same as in the case of the example 1 and results thus obtained are shown in Table 1 and FIG. 2.

EXAMPLE 3:

Laminated products were prepared same as in the case of the example 1 but changing the cloth (C) as follows and these laminated products were used as our samples 3–6.

Sample 3: raised tricot
  Raw material: polyester
  Surface apparent resistivity: $7.54 \times 10^{14}$ ohms/sq.
Sample 4: plain weave
  Raw material: polyester
  Surface apparent resistivity: $7.54 \times 10^{15}$ ohms/sq.
Sample 5: unwoven cloth
  Raw material: polyester. Characteristic value: 36 g/m$^2$
  Surface apparent resistivity: $9.42 \times 10^{15}$ ohms/sq.
Sample 6: sheet of vinyl chloride
  Raw material: polyvinyl chloride
  Surface apparent resistivity: $1.56 \times 10^{14}$ ohms/sq.

The samples 3–6 were valued, same as in the case of the example 1, about their electrostatic properties, and results thus obtained are shown in Table 1 and FIG. 3.

EXAMPLE 4:

Our sample 7 was prepared same as in the case of the example 1 but being flame-laminated without using the bonding agent of the polyurethane system. The electrostatic property of our this sample 7 was valued same as in the case of the example 1, and a result thus obtained is shown in Table 1.

TABLE 1

| Sample No. | | Sample Component | 5000 V–500 V Decay time (Sec) |
| --- | --- | --- | --- |
| Example 1 and Comparison Example 1 | Our Sample 1 | Antistatic foam a (A) was bonded to cloth (C) | 0.34 |
| | Comparison Sample 1 | Conventional urethane foam (B) was bonded to cloth (C) | Not decay to 500 V |
| | Reference Sample 1 | Antistatic foam a (A) only | 0.14 |
| | Reference Sample 2 | Conventional urethane foam (B) only | Not decay to 500 V |
| | Reference Sample 3 | Cloth (C) only | Not decay to 500 V |
| Example 2 and Comparison Example 2 | Our Sample 2 | Antistatic foam b (E) was bonded to cloth (D) | 0.07 |
| | Comparison Sample 2 | Conventional urethane foam (B) was bonded to cloth (D) | Not decay to 500 V |
| Example 3 | Our Sample 3 | Antistatic foam a (A) was bonded to raised tricot cloth | 0.32 |
| | Our Sample 4 | Antistatic foam a (A) was bonded to plain woven cloth | 0.31 |
| | Our Sample 5 | Antistatic foam a (A) was bonded to unwoven cloth | 0.31 |
| | Our Sample 6 | Antistatic foam a (A) was bonded to vinyl chloride sheet | 0.13 |
| Example 4 | Our Sample 7 | Antistatic foam a (A) was flame-laminated to cloth (C) | 0.28 |

Condition: 23° C. (Temperature), 8% RH (Humidity)

What is claimed is:

1. A laminated product characterized in that polyurethane foam whose surface apparent resistivity is smaller than $1 \times 10^{13}$ ohms/sq. (condition: 23° C., 8%RH) to create antistatic effect is laminated on the back side of a skin material.

2. A laminated product according to claim 1 wherein said laminated product is used as a motorcar seats, carpets, blankets, sofas, chair seats and the like.

3. A laminated product according to claim 1 wherein said skin material is cloth or sheet.

4. A laminated product according to claim 3 wherein said cloth is woven, knitted or unwoven cloth.

5. A laminated product according to claim 3 wherein said sheet is of resin.

6. A laminated product according to claim 1, wherein the surface apparent resistivity of said foam is in a range of $1 \times 10^{12} - 1 \times 10^{5}$ ohms/sq. (condition; 23° C., 8%RH).

7. A laminated product according to claim 1, wherein said polyurethane foam contains a surface-active agent.

8. A laminated product according to claim 1, wherein said polyurethane foam contains carbon black.

9. A laminated product according to claim 2 wherein said skin material is cloth or sheet.

10. A laminated product according to claim 2 wherein the surface apparent resistivity of said foam is in a range of $1 \times 10^{12} - 1 \times 10^{5}$ ohms/square (condition; 23% C., 8%RH).

11. A laminated product according to claim 3 wherein the surface apparent resistivity of said foam is in a range of $1 \times 10^{12} - 1 \times 10^{5}$ ohms/square (condition; 23° C., 8%RH).

12. A laminated product according to claim 4 wherein the surface apparent resistivity of said foam is in a range of $1 \times 10^{12} - 1 \times 10^{5}$ ohms/square (condition; 23° C., 8%RH).

13. A laminated product according to claim 5 wherein the surface apparent resistivity of said foam is in a range of $1 \times 10^{12} - 1 \times 10^{5}$ ohms/square (condition; 23° C., 8%RH).

14. A laminated product according to claim 2 wherein said polyurethane foam contains a surface-active agent.

15. A laminated product according to claim 3 wherein said polyurethane foam contains a surface-active agent.

16. A laminated product according to claim 4 wherein said polyurethane foam contains a surface-active agent.

17. A laminated product according to claim 5 wherein said polyurethane foam contains a surface-active agent.

18. A laminated product according to claim 6 wherein said polyurethane foam contains a surface-active agent.

19. A laminated product according to claim 2 wherein said polyurethane foam contains carbon black.

20. A laminated product according to claim 3 wherein said polyurethane foam contains carbon black.

21. A laminated product according to claim 4 wherein said polyurethane foam contains carbon black.

22. A laminated product according to claim 5 wherein said polyurethane foam contains carbon black.

23. A laminated product according to claim 6 wherein said polyurethane foam contains carbon black.

24. A laminated product according to claim 9 wherein said polyurethane foam contains a surface-active agent.

25. A laminated product according to claim 9 wherein said polyurethane foam contains carbon black.

* * * * *